(12) United States Patent
Nie (10) Patent No.: US 10,743,709 B2
(45) Date of Patent: Aug. 18, 2020

(54) MULTIFUNCTIONAL COOKING AND BAKING ASSEMBLY

(71) Applicant: Jiangmen City Xinhui Henglong Plastic Co., Ltd., Jiangmen (CN)

(72) Inventor: Huayao Nie, Guangdong Province (CN)

(73) Assignee: JIANGMEN CITY XINHUI HENGLONG INNOVATIVE HOUSEWARES CO., LTD., Jiangmen, Guangdong Province (CN)

( * ) Notice: Subject to any disclaimer, the term of this patent is extended or adjusted under 35 U.S.C. 154(b) by 421 days.

(21) Appl. No.: 15/619,608

(22) Filed: Jun. 12, 2017

(65) Prior Publication Data
US 2018/0332999 A1    Nov. 22, 2018

(30) Foreign Application Priority Data
May 22, 2017    (CN) .......................... 2017 1 0364351

(51) Int. Cl.
*A47J 37/06*    (2006.01)
*H05B 3/68*    (2006.01)
*H05B 3/06*    (2006.01)

(52) U.S. Cl.
CPC ....... *A47J 37/0611* (2013.01); *A47J 37/0629* (2013.01); *H05B 3/06* (2013.01); *H05B 3/68* (2013.01)

(58) Field of Classification Search
CPC .. A47J 37/0611; A47J 37/0786; A47J 37/067; H05B 6/12
See application file for complete search history.

(56) References Cited

U.S. PATENT DOCUMENTS

| | | | | |
|---|---|---|---|---|
| 2,827,847 A * | 3/1958 | Shafter | ............... | A47J 37/0694 99/402 |
| 4,178,500 A * | 12/1979 | Brindopke | ........... | A47J 37/0611 219/386 |
| 6,389,959 B1 * | 5/2002 | Robertson | ............ | A47J 37/0611 219/386 |
| 7,109,442 B2 * | 9/2006 | Steinberg | ............. | A47J 37/0611 219/386 |
| 7,600,469 B2 * | 10/2009 | Lin | ..................... | A47J 37/0704 99/349 |
| 7,717,028 B2 * | 5/2010 | Serra | .................... | A47J 37/0611 99/339 |

(Continued)

*Primary Examiner* — Dana Ross
*Assistant Examiner* — Lawrence H Samuels
(74) *Attorney, Agent, or Firm* — Dicke, Billig & Czaja, PLLC (57) ABSTRACT

A multifunctional cooking and baking assembly, which comprises an upper housing and a lower housing hinged mutually, wherein the upper housing and the lower housing are respectively provided with a chamber, a griddle plate is arranged inside the chamber, the chambers of the upper housing and the lower housing are connected through a connecting passage in which the griddle plate can be placed. The multifunctional cooking and baking assembly of the invention can integrate the functions of closed baking and open broiling by rotating the upper housing and the lower housing to a preset angle to match with the type switch of the griddle plates, and also has the functions of pan baking, frying, deep frying, stir frying, heating, and unfreezing when an overall griddle plate is used.

7 Claims, 5 Drawing Sheets

(56) References Cited

U.S. PATENT DOCUMENTS

| | | | | |
|---|---|---|---|---|
| 7,960,673 B2* | 6/2011 | Li | ............................ | A47J 36/38 219/450.1 |
| 8,261,657 B2* | 9/2012 | Serra | .................... | A47J 37/0611 99/380 |
| 8,621,986 B2* | 1/2014 | Serra | .................... | A47J 37/0611 99/333 |
| 9,314,133 B2* | 4/2016 | Fung | .................... | A47J 37/0611 |
| 9,332,878 B1* | 5/2016 | Green | .................... | A47J 37/049 |
| 10,070,753 B2* | 9/2018 | Fung | .................... | A47J 37/0611 |
| 2004/0050256 A1* | 3/2004 | Patenotre | ............. | A47J 37/0611 99/331 |
| 2006/0049164 A1* | 3/2006 | Bryan | .................. | A47J 37/0611 219/386 |
| 2006/0049169 A1* | 3/2006 | Li | ........................ | A47J 37/0611 219/450.1 |
| 2006/0213373 A1* | 9/2006 | Fernandez | ........... | A47J 37/0611 99/349 |
| 2007/0006740 A1* | 1/2007 | Lam | ..................... | A47J 37/0611 99/372 |
| 2007/0017384 A1* | 1/2007 | Serra | .................... | A47J 37/0611 99/372 |
| 2007/0277678 A1* | 12/2007 | Mangano | ............. | A47J 37/0611 99/426 |
| 2008/0116193 A1* | 5/2008 | Lam | ..................... | A47J 37/0611 219/450.1 |
| 2008/0142503 A1* | 6/2008 | Li | ........................... | A47J 36/38 219/450.1 |
| 2010/0212513 A1* | 8/2010 | Huang | ................. | A47J 37/0611 99/377 |
| 2010/0319550 A1* | 12/2010 | Wu | ....................... | A47J 37/0611 99/380 |
| 2012/0168432 A1* | 7/2012 | Liu | .......................... | H05B 6/12 219/647 |
| 2015/0033950 A1* | 2/2015 | Fung | .................... | A47J 37/0611 99/339 |
| 2015/0257592 A1* | 9/2015 | Garman | ............... | A47J 37/0611 219/450.1 |
| 2015/0366402 A1* | 12/2015 | Wu | ....................... | A47J 37/0611 99/340 |

\* cited by examiner

MULTIFUNCTIONAL COOKING AND BAKING ASSEMBLY

TECHNICAL FIELD

The present disclosure relates to the processing field of food cooking and baking, and particularly relates to a multifunctional cooking and baking assembly.

BACKGROUND

A waffle maker needs to include closed space for food baking. The existing waffle maker generally includes two relatively rotating housings. The housings are internally provided with griddle plates and heating plates, and the griddle plates are heated by the heating plates. The closed space for baking a waffle can be provided by covering the two griddle plates with the relative rotation of the housings. The reference to a specific structure can be made to the disclosure in the applications CN201220403354.7, CN201110030376.3, CN201620578601.5, CN201620453288.2 and CN201320442861.6. In prior art, the waffle maker generally is monotonous in function and has only one function of food baking, since the two housings thereof are separate or not connected. Furthermore, the mutually independent griddle plates in the two housings and small space for food accommodation of the griddle plates result in low cooking efficiency. Therefore, it needs a griddle plate switching assembly which enables the waffle maker to integrate the functions of pastry baking as well as meat and vegetables broiling.

SUMMARY

Some embodiments of the present disclosure are intended to solve the technical problems mentioned above by providing a griddle plate switching assembly which enables the waffle maker to integrate various functions including food baking and broiling, and increases the cooking efficiency.

Some embodiments of the present disclosure are implemented through the following technical solutions.

A multifunctional cooking and baking assembly comprises an upper housing and a lower housing hinged mutually, the upper housing and the lower housing are respectively and internally provided with a chamber, in which an griddle plate is arranged, and wherein the chambers of the upper housing and the lower housing are connected through a connecting passage in which the griddle plate can be placed.

In some embodiments, the griddle plate is an overall griddle plate extending from the inside of the chamber of the upper housing to the inside of the chamber of the lower housing through the connecting passage.

In some embodiments, the multifunctional cooking and baking assembly further comprises fasteners for installing or removing the griddle plate to or from the upper housing and/or the lower housing.

In some embodiments, the fasteners comprise a plurality of recesses arranged on the griddle plate, and bulges arranged on the upper housing and the lower housing and movably embedded in corresponding recesses.

In some embodiments, the bulges enter and leave the recesses by means of rotating, and the upper housing and the lower housing are respectively provided with a tension spring for pulling the bulges into the recesses.

In some embodiments, the upper housing and the lower housing are respectively provided with a level, one end of the level is connected with the bulge and the tension spring, and the other end of the level is connected with a button which separates the bulge from the recess in a pressing manner.

In some embodiments, the fastener comprises a plurality of location holes arranged on the upper housing and the lower housing, and location lugs arranged on the griddle plate and corresponding to the location holes.

In some embodiments, the upper housing is connected with the lower housing through at least two coaxial hinges, and the connecting passage is formed in the space between two neighboring hinges.

In some embodiments, an adjacent wall of the upper housing and the lower housing is lower than an axis where the upper housing rotates relatively to the lower housing, and the connecting passage is formed in the space between the axis and the adjacent wall.

In some embodiments, a heating element is arranged under the griddle plate inside the chamber, the heating element is lower than the axis where the upper housing rotates relatively to the lower housing, and the connecting passage is formed in the space between the axis and the heating element.

The beneficial effects can be as follows: compared with the prior art, the multifunctional cooking and baking assembly of the present disclosure can bake pastry like waffle, toast and sandwich through closed baking space formed by the two griddle plates which are mutually covered when the upper housing and the lower housing rotate to a mutually covered position; and can broil meat and vegetable food through open broiling space formed by the overall griddle plate which can cover the chamber of the upper housing, the connecting passage and the chamber of the lower housing when the upper housing and the lower housing rotate to a relative opened position. Based on the function of waffle baking, the multifunctional cooking and baking assembly of the present disclosure can integrate the functions of closed baking and open broiling by rotating the upper housing and the lower housing to a preset angle to match with the type switch of the griddle plates, and also has the functions of pan baking, frying, deep frying, stir frying, heating, and unfreezing when the overall griddle plate is used; the efficiency of cooking and baking can be increased by full use of the food holding space of the overall griddle plate, and rotationally folding the upper housing and the lower housing can further enable the multifunctional cooking and baking assembly to be portable and convenient to use.

BRIEF DESCRIPTION OF THE DRAWINGS

The embodiments of the present disclosure will be further described in details with reference to the attached drawings, wherein.

DETAILED DESCRIPTION

A multifunctional cooking and baking assembly comprises an upper housing 1 and a lower housing 2 hinged mutually, the upper housing 1 and the lower housing 2 may have a relative rotation angle no less than 180 degrees, the upper housing 1 and the lower housing 2 are respectively and internally provided with a chamber 3, the chambers 3 in the upper housing 1 and the lower housing 2 may be arranged towards opposition directions, and the chambers 3 are internally provided with griddle plates 5. The respective griddle plates 5 of the upper housing 1 and the lower housing 2 may be mutually covered or mutually opened during rotating, and both the mutual covering and mutual opening need the upper housing 1 and the lower housing 2 to rotate by 180 degrees. When the griddle plates 5 in the upper housing 1 and the lower housing 2 are located in an opened position, the upper housing 1 and the lower housing 2 are connected through a connecting passage 4 in which the griddle plate 5 can be placed.

Figure 1:
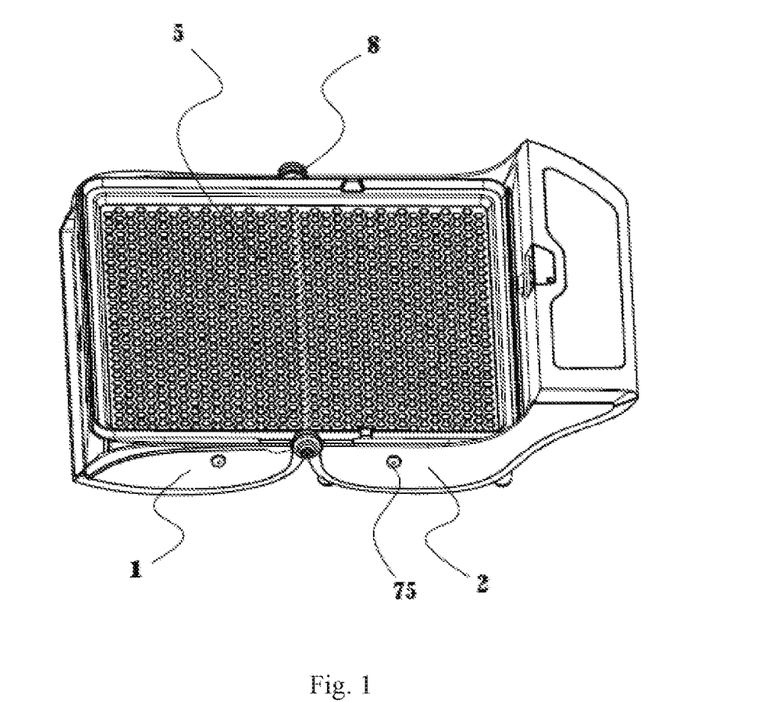
FIG. 1 is a structure diagram of a cooking and baking assembly according to the present disclosure, wherein an overall griddle plate for broiling is provided thereon.
Figure 2:
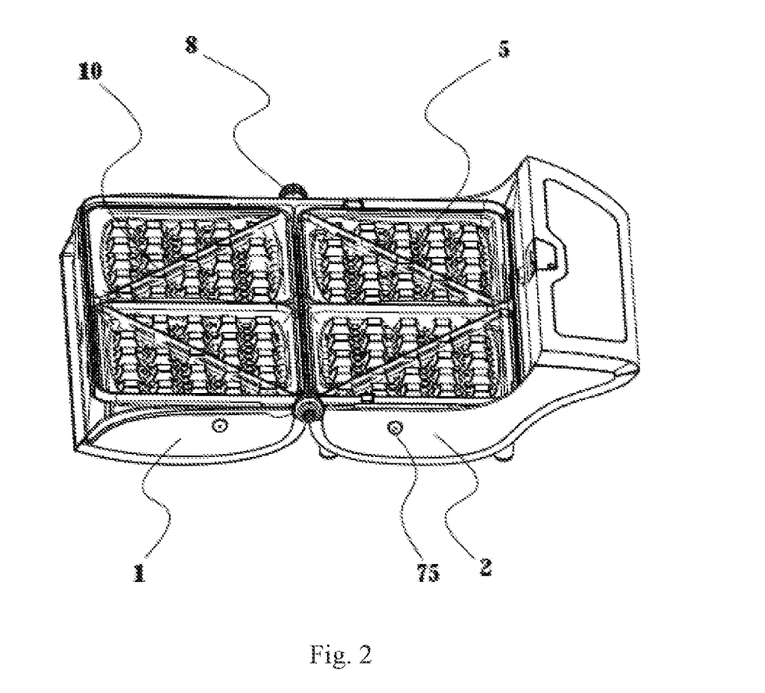
FIG. 2 is a structure diagram of the cooking and baking assembly, wherein a griddle plate for waffle baking is provided thereon.
Figure 3:
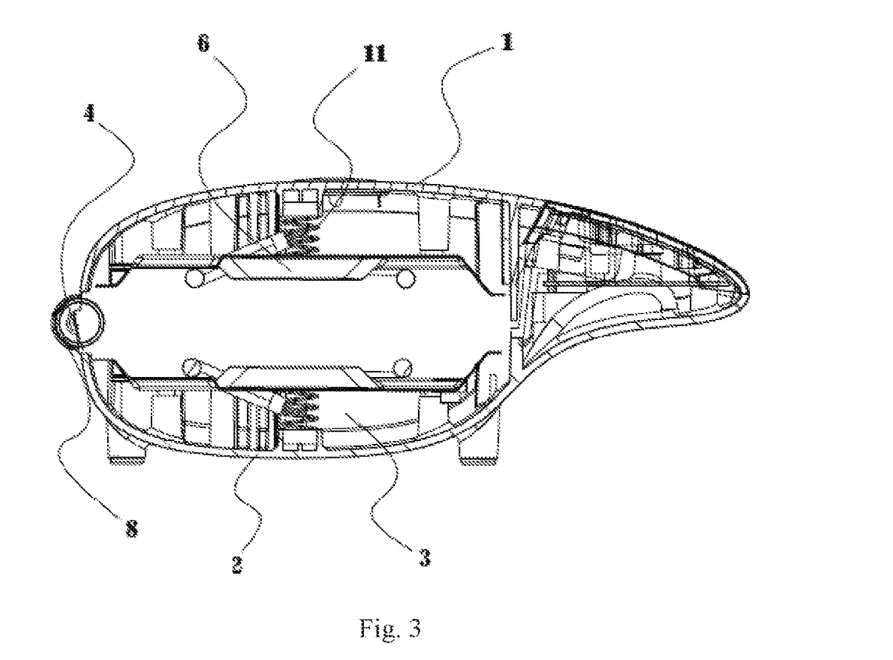
FIG. 3 is a section diagram of the cooking and baking assembly without the griddle plate while being covered.
Figure 4:
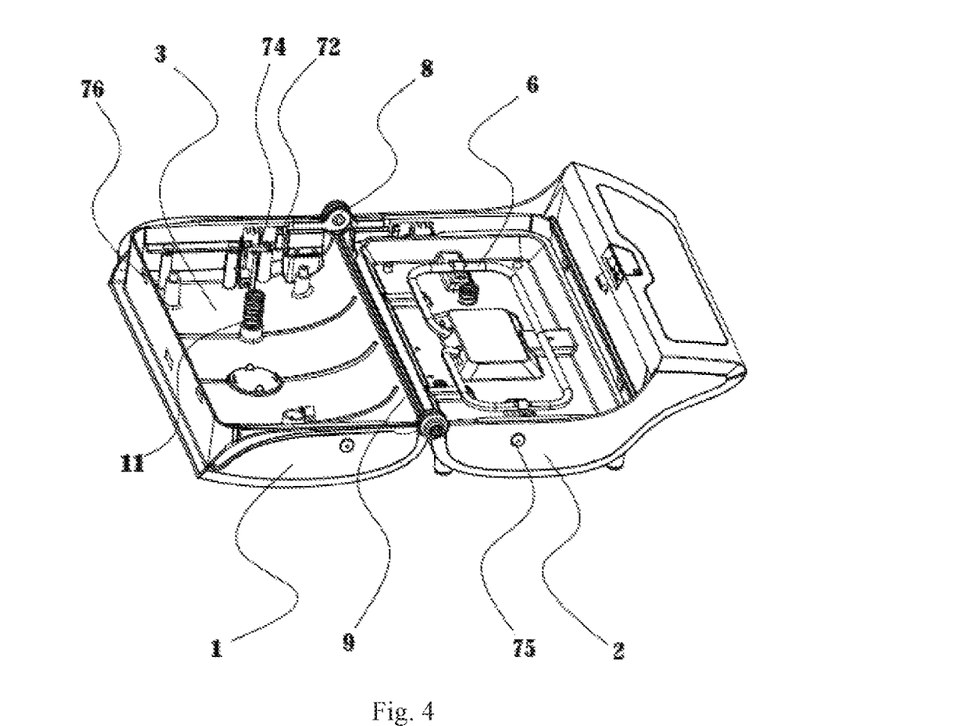
FIG. 4 is a partial structure diagram of the cooking and baking assembly while being opened.
Figure 10:
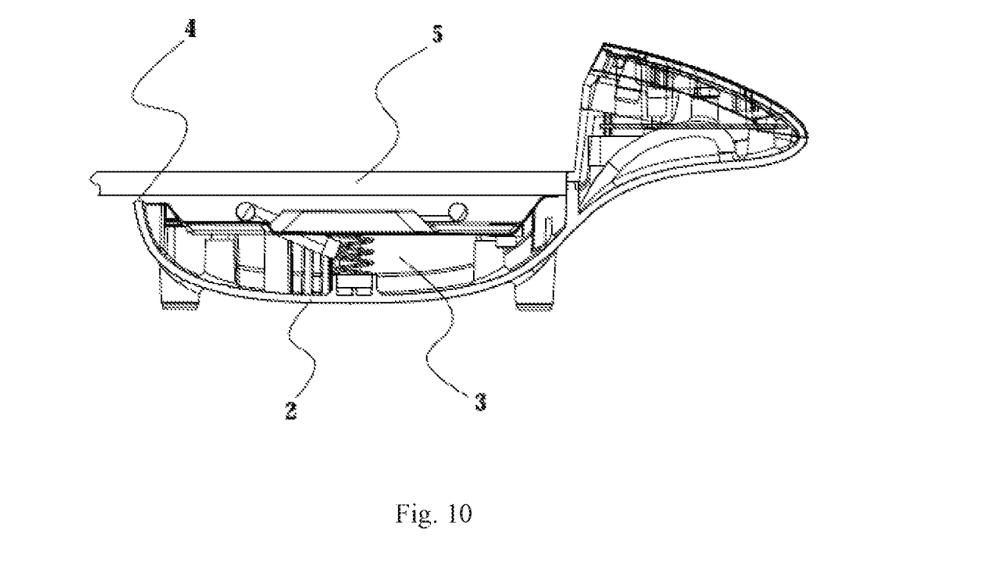
FIG. 10 is a structure diagram illustrating the griddle plate extending from a chamber to a connecting passage.

As shown in FIGS. 2, 3 and 10, the upper housing 1 is in butt joint with the lower housing 2 through the connecting passage 4. Because the griddle plate 5 can be placed in the connecting passage 4, the griddle plate 5 may be set to be an overall griddle plate extending from inside of the chamber 3 of the upper housing 1 to inside of the chamber 3 of the lower housing 2 through the connecting passage 4. The overall griddle plate is open and can be used for meat and vegetable food broiling and even for multiple cooking and baking styles like pan baking, frying, deep frying, stir frying, heating, unfreezing, etc.

As shown in FIG. 3, when the upper housing 1 and the lower housing 2 rotate to be mutually covered, an overall accommodation chamber can be formed in the chambers 3 inside the upper housing 1 and the lower housing 2. The respective griddle plates 5 of the upper housing 1 and the lower housing 2 are mutually covered in the overall accommodation chamber to form closed space. The closed space may be used for baking pastry, such as waffles, toasts and sandwiches.

The mutual covering of the upper housing 1 and lower housing 2 enable the multifunctional cooking and baking assembly to be compressed into a handbag shape. The multifunctional cooking and baking assembly also has multiple functions like baking, broiling, pan baking, frying, deep frying, stir frying, heating and unfreezing, and can be widely used in home kitchen, travelling, friends' dinner, or the like. Furthermore, the multifunctional cooking and baking assembly is of strong functionality, portability, and pleasant appearance.

As shown in FIG. 1 to FIG. 9, the multifunctional cooking and baking assembly may further comprise fasteners 7 for installing or removing the griddle plate 5 to or from the upper housing 1 and/or the lower housing 2. The cooking and baking assembly has various functions; therefore, the griddle plate 5 can be switched properly according to different cooking and baking modes. For example, for waffle baking, the griddle plate 5 needs to comprise two plates separately arranged in the upper housing 1 and the lower housing 2, and the griddle plate 5 also needs to be internally provided with corresponding waffle-shaped molds for the purpose of gradually forming a waffle shape during baking. During baking, the upper housing 1 and the lower housing 2 need to be mutually covered; when broiling, the upper housing 1 and the lower housing 2 need to be rotated to an opened position and then the overall griddle plate need to be arranged in the upper housing 1, the lower housing 2 and the connecting passage 4, so that the food accommodation space of the overall griddle plate can be fully used to increase the cooking and baking efficiency.

The griddle plate 5 can be switched by using the fasteners 7 arranged on the upper housing 1 and/or the lower housing 2, which facilitates switching the griddle plate 5 and enables the switched griddle plate 5 to be firmly connected with the upper housing 1 and/or the lower housing 2. Whether the fasteners 7 are arranged on the upper housing 1 or the lower housing 2 or both is determined on the basis of the rotating manner of the multifunctional cooking and baking assembly. When the multifunctional cooking and baking assembly rotates based on the lower housing 2 and the upper housing 1 rotates relatively to the lower housing 2, the fasteners 7 may be arranged on the upper housing 1. Preferably, the upper housing 1 and the lower housing are respectively provided with fasteners 7 to facilitate quickly switching the griddle plate 5 and to ensure that the switched griddle plate is firmly connected with the upper housing 1 and the lower housing 2.

Figure 6:
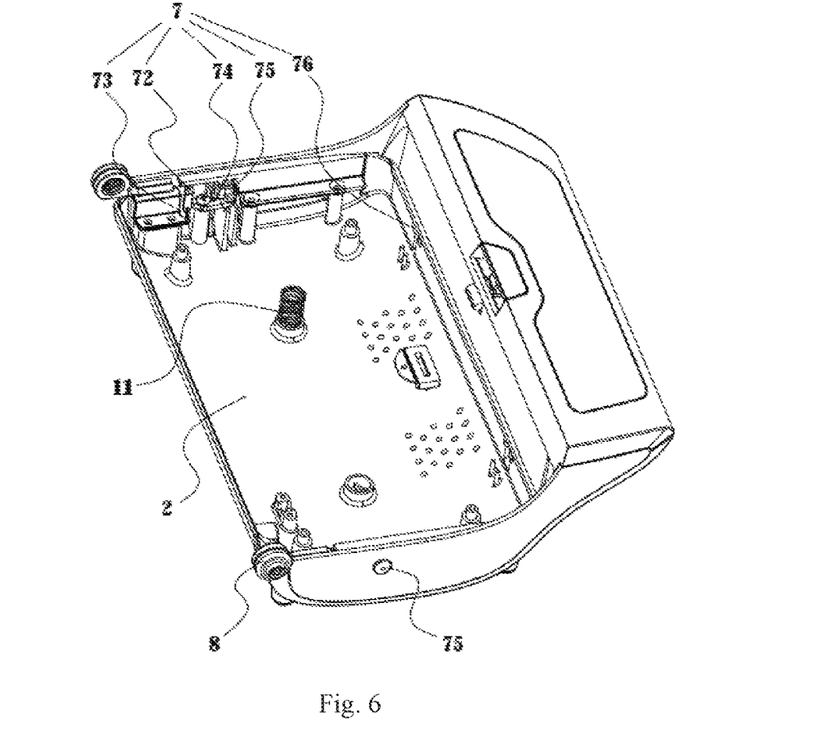
FIG. 6 is a structure diagram of a lower housing part of the cooking and baking assembly.
Figure 7:
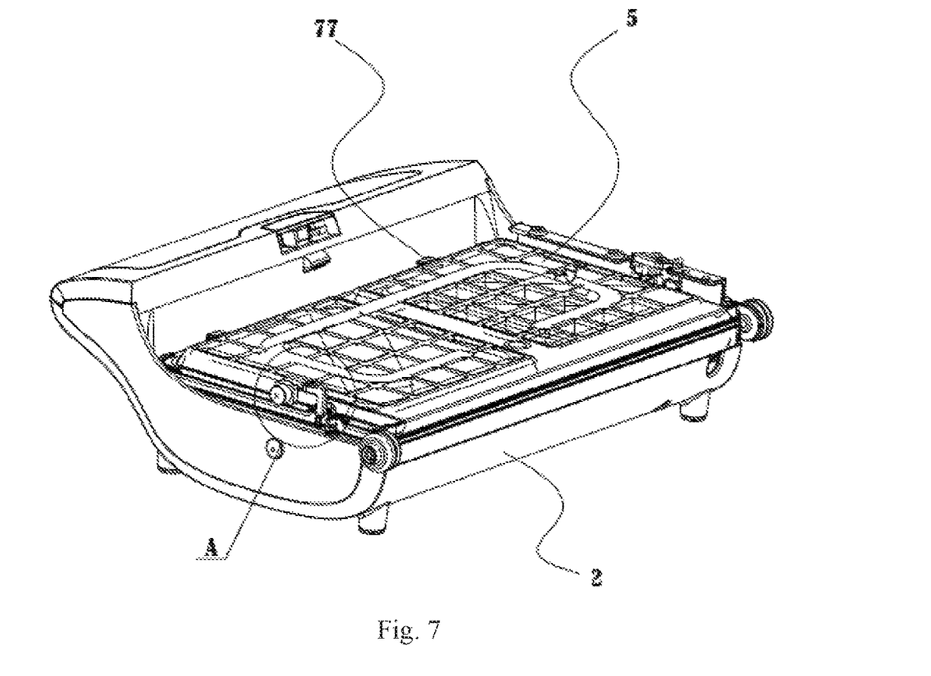
FIG. 7 is a structure diagram of a lower housing part of the cooking and baking assembly.
Figure 8:
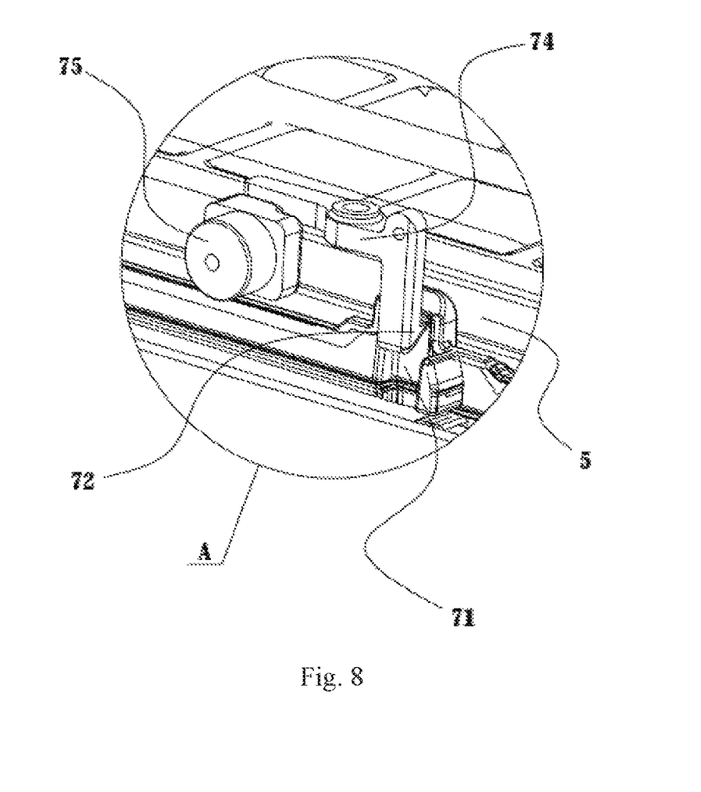
FIG. 8 is a partial enlarged diagram to part A of FIG. 7.
Figure 9:
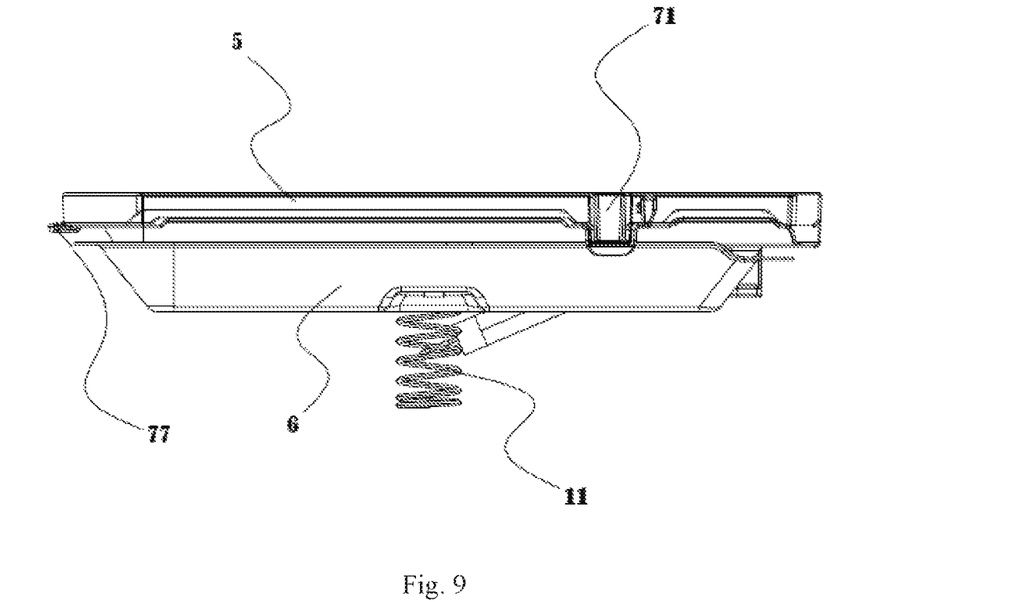
FIG. 9 is a connection structure diagram of the griddle plate and an elastic part.

As shown in FIG. 6 to FIG. 8, the fasteners 7 may comprise a plurality of recesses 71 arranged on the griddle plate 5, and bulges 72 arranged on the upper housing 1 and the lower housing 2 and movably embedded in corresponding recesses 71. The recesses 71 may be arranged at the side of the griddle plate 5, the bulges 72 are arranged at a position corresponding to the recesses 71, and the griddle plate 5 is fastened by moving the bulges 72 into or out of the recesses 71. When it is necessary to switch the griddle plate 5, moving the bulges 72 to separate the griddle plate 5 from the upper housing 1 and the lower housing 2 is needed.

The fastener 7 may comprise movable clamp plates which can clamp the griddle plate 5 during moving. The clamp plates are arranged on the upper housing 1 and the lower housing 2. The griddle plate 5 is fixed with or separated from the upper housing 1 and the lower housing 2 by moving the clamp plates.

The bulges 72 may enter and leave the recesses 71 by means of rotating. The upper housing 1 and the lower housing 2 are respectively provided with a tension spring 73 for pulling the bulges 72 into the recesses 71. The bulges 72 may be embedded into the recesses 71 under the pre-tightening force of the tension spring 73 and separate from the recesses 71 by rotating the bulges 72 to overcome the pre-tightening force of the tension spring 73.

The upper housing 1 and the lower housing 2 can be provided with a level 74 respectively. One end of the level 74 is connected with the bulge 72 and the tension spring 73, and the other end is connected with a button 75 which separates the bulge 72 from the recess in a pressing manner. When it is necessary to replace the griddle plate 5, the user may, by means of pressing the button 75, rotate the level 74 to overcome the pre-tightening force and drive the bulge 72 to leave the recess 71 so as to enable the griddle plate 5 to move relatively to the upper housing 1 and the lower housing 2.

The fastener 7 comprises a plurality of location holes 76 arranged on the upper housing 1 and the lower housing 2, and location lugs 77 arranged on the griddle plate 5 and corresponding to the location holes 76. The location lug 77 may be arranged at the side of the griddle plate 5, and the location hole 76 is arranged correspondingly to the location lug 77. Before fixing the griddle plate 5 by mating the bulge 72 to the recess 71, the location lug 77 may be penetrated through the location hole 76 to limit the griddle plate 5 and then the griddle plate 5 is gradually pressed into the chambers 3 of the upper housing 1 and the lower housing 2 to fasten the griddle plate 5 by mating the bulge 72 to the recess 71. The griddle plate 5 may be installed quickly under the mating function of the location lug 77 with the location hole 76.

As shown in FIG. 1 to FIG. 6, the upper housing 1 may be connected with the lower housing 2 by at least two coaxial hinges 8, and the connecting passage 4 is formed in the space between two neighboring hinges 8. The hinge 8 is used as a connecting part between the upper housing 1 and the lower housing 2 and therefore no actual rotation shaft is necessary to hinge the upper housing 1 and the lower housing 2, so that the position space for connecting the upper housing 1 with the lower housing 2 is conserved and enough room for forming the connecting passage 4 in which the overall griddle plate is placed may be provided.

The hinge 8 may provide a damping force. After the upper housing 1 and the lower housing 2 are covered, latch fasteners may be used to fix the upper housing 1 and the lower housing 2 at a relative position for closed baking purpose. After the completion of the closed baking, loosening the latch fasteners can drive the upper housing 1 to bounce up under the damping force of the hinges 8, and separate the two griddle plates 5 to disperse steam from the griddle plates 5. That is after the completion of the baking no manual operation is needed to separate the upper housing 1 from the lower housing 2, which can prevent a hand from being scalded. The damping force of the hinge 8 may be provided by a torsion spring arranged in the hinge 8.

Figure 5:
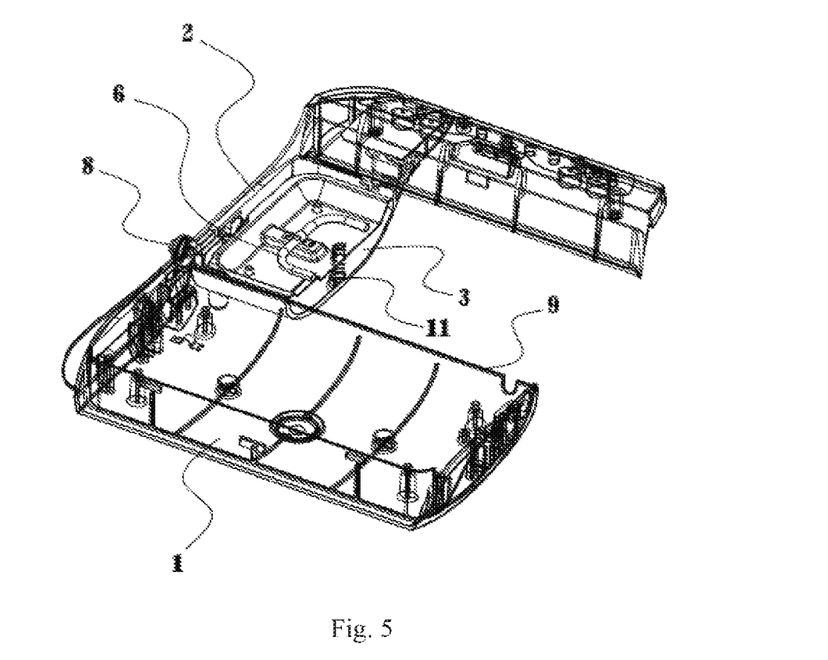
FIG. 5 is a section diagram of a partial structure of the cooking and baking assembly while being opened.

As shown in FIG. 5, an adjacent wall 9 of the upper housing 1 and the lower housing 2 is lower than an axis where the upper housing 1 rotates relatively to the lower housing 2. The griddle plate 5 is arranged between the adjacent wall 9 of the upper housing 1 and the lower housing 2 and the axis, and may be supported by the adjacent wall 9. A groove allowing the adjacent wall 9 to enter may also be arranged at the bottom of the griddle plate 5 and function as assistant positioning in installing the griddle plate 5.

As shown in FIG. 2, both the upper housing 1 and the lower housing 2 may be provided with raised ribs 10 on their griddle plates. The raised ribs used in the griddle plates 5 may be different in shape due to the types of different foods, such as waffle, sandwich, toast and other biscuits of different shapes. The shape of the raised rib 10 may be determined according to the actual demands of the foods to be baked. The raised ribs 10 may be higher than the tops of the griddle plates 5, and mutually interlaced after the upper housing 1 and the lower housing 2 rotate to close. The interlaced ribs 10 may fit closely. After the two griddle plates 5 are covered by means of interlaced fit, every chamber formed by the surrounding raised ribs 10 can provide good sealing performance and high food baking efficiency. The raised rib 10 may be parallel to the top of the griddle plate 5. The raised ribs 10 can be in interference fit under the pre-tightening force of the elastic part 11, which can improve the sealing performance of the griddle plates 5 after being covered.

As shown in FIGS. 3, 4, 5 and 9, a heating element 6 may be arranged under the griddle plate 5 inside the chamber 3. The heating element 6 may be either a heating plate in close fit under the griddle plate or a heating tube directly arranged under the griddle plate 5 as well as a support for fixing the heating tube, wherein the heating plate is wound up with a heating tube. When the heating element 6 comprises the heating plate and the heating tube, the heating plate includes a trough in which the heating tube is placed. The heating plate may closely fit to the griddle plate 5 under the pressure of the elastic part 11. The heating plate may be higher than the adjacent wall 9 of the upper housing 1 and the lower housing 2. In this way, the heating plate may be kept close fit to the griddle plate 5 in the switchover process under the action of the elastic part 11. Furthermore, the elastic part 11 can apply upward pretention to the griddle plate 5 after being fixed, and cooperate with the fastener 7 for fixing the griddle plate 5 to keep the fixed griddle plate 5 being securely attached on the upper housing 1 and the lower housing 2. In this case, the recess 71 of the fastener 7 may be shaped in vertical bar which allows the bulge to move vertically in the recess 71, and facilitates adjusting the position of the griddle plate 5 relatively to the upper housing 1 and the lower housing 2 as well as quickly removing the griddle plate 5.

The heating element 6 may be lower than the axis where the upper housing 1 rotates relatively to the lower housing 2, and the connecting passage 4 is formed in the space between the axis and the heating element 6. The griddle plate 5 may be supported by the heating plate in the heating element 6. When the upper housing 1 and the lower housing 2 lie flat, the heating plates in the upper housing 1 and the lower housing 2 can simultaneously support the griddle plate 5 under the function of the elastic part 11 and enable heat of the heating plates to transfer quickly and uniformly to the griddle plate 5.

For various cooking and baking modes, the multifunctional cooking and baking assembly may comprise a power source module and a temperature control module for controlling the heating capacity of the heating element 6, and may further comprise a temperature sensor module for controlling the heating capacity of the heating element 6 based on the actual temperature sensed in cooking and baking process.

The power source module can supply power needed by the heating element 6 either through a battery or a supply circuit. In the later case, the multifunctional cooking and baking assembly is electrified by a plug. That is the live parts of the multifunctional cooking and baking assembly are electrified with needed power after the alternate current from the mains supply is converted with an adapter into steady direct current.

The temperature sensor module may comprise a temperature sensor arranged in the upper housing 1, the lower housing 2 or the griddle plate 5. The temperature sensor may be a thermoresistive or thermocouple sensor. Real-time temperature sensed by the temperature sensor can be fed back to the temperature control module, and the heating productivity of the heating element 6 can be regulated by controlling the output voltage of the temperature control module. The temperature sensor module may further comprise a bimetal strip thermostat arranged on the supply circuit of the heating element 6. When the temperature sensor detects in real time that the cooking and baking temperature exceeds risk threshold, the temperature sensor disconnects the supply circuit to power off the heating element 6.

The multifunctional cooking and baking assembly may further comprise a display module. The display module comprises an LED display. The LED display is used to display according to current mode of the cooking and baking assembly and monitor the temperature in real time. Considering different cooking and baking modes require different heating capacity from the heating element 6, each mode needs to be provided with a correspondingly relatively optimal temperature interval. The corresponding cooking and baking modes may be thermostatically controlled by arranging a function button on the upper housing 1 or the lower housing 2 and then through switching over the modes by pressing the function button. While switching over the cooking and baking mode, the temperature control module controls the heating capacity of the heating element 6 according to an optimal temperature value corresponding to the cooking and baking mode. In cooking and baking process, the temperature becomes constant after the temperature value is corrected by a temperature signal fed back by the temperature sensor.

The multifunctional cooking and baking assembly may further comprise a buzzer. The buzzer can prompt the user upon the completion of cooking and baking process. The time for cooking and baking can be manually set. In this case, the buzzer prompts the user after the manually set time is up. The buzzer may be further connected with the temperature sensor, and in case the actual temperature in the griddle plates 5 is higher than the set value or the temperature sensor is failed, alarm and prompt the user. The display module may be provided with corresponding fault alarm lamp(s).

The multifunctional cooking and baking assembly may further comprise a heat dissipation module. The heat dissipation module may be a cooling fan driven by the power source module. The cooling fan may be arranged in the chamber 3 of the upper housing 1 or the lower housing 2. Preferably, the chamber 3 in which the cooling fan is arranged locates at a space between the heating element 6 and the upper housing 1 or the lower housing 2. Either the upper housing 1 or the lower housing 2 may be provided with a heat vent. The heat dissipation module is used to quickly dissipate heat produced by the heating element 6 and retained in the upper housing 1 or the lower housing 2. Besides, moisture and odor can be taken away with air circulation flow.

The embodiments above are not limited to the technical solutions of the embodiments thereof, and the embodiments may be mutually combined to form new embodiments. The embodiments above are only used for illustrating the technical solutions of the invention instead of limiting. Any amendment or equivalent replacement not departing from the spirit and scope of the invention shall all fall within the scope of the technical solutions as claimed.

What is claimed is:

1. A multifunctional cooking and baking assembly, comprising an upper housing and a lower housing hinged with the upper housing mutually, wherein the upper housing and the lower housing are respectively and internally provided with a chamber in which a griddle plate is arranged, a heating element is arranged under the griddle plate inside the chamber of the lower housing, the upper housing is connected with the lower housing through at least two coaxial hinges, and a connecting passage is formed in the space between two neighboring hinges of the at least two coaxial hinges, and wherein the chambers of the upper housing and the lower housing are connected through the connecting passage in which the griddle plate can be placed;

wherein the upper housing and the lower housing are rotatable relative to one another by 180 degrees between a closed position and an opened position;

and further wherein in the opened position, the respective chambers are located at the same level, and the griddle plate is an overall griddle plate extending from the chamber of the upper housing to the chamber of the lower housing through the connecting passage.

2. The multifunctional cooking and baking assembly according to claim 1, further comprising fasteners for at least one of installing or removing the griddle plate to or from at least one of the upper housing and the lower housing.

3. The multifunctional cooking and baking assembly according to claim 2, wherein the fasteners comprise a plurality of recesses arranged on the griddle plate, and bulges arranged on the upper housing and the lower housing and movably embedded in corresponding recesses.

4. The multifunctional cooking and baking assembly according to claim 3, wherein the bulges enter and leave the recesses by means of rotating, and the upper housing and the lower housing are respectively provided with a tension spring for pulling the bulges into the recesses.

5. The multifunctional cooking and baking assembly according to claim 4, wherein the upper housing and the lower housing are provided with a respective level, one end of the level is connected with the bulge and the tension spring, and the other end of the level is connected with a button which separates the bulge from the recess in a pressing manner.

6. The multifunctional cooking and baking assembly according to claim 2, wherein the fastener comprises a plurality of location holes arranged on the upper housing and the lower housing, and location lugs arranged on the griddle plate and corresponding to the location holes.

7. The multifunctional cooking and baking assembly according to claim 1, wherein a close lateral wall of the upper housing and the lower housing is lower than axis where the upper housing rotates relative to the lower housing, and the connecting passage is formed in the space between the axis and the lateral wall.

\* \* \* \* \*